(12) United States Patent
Umezawa (10) Patent No.: US 10,525,855 B2
(45) Date of Patent: Jan. 7, 2020

(54) VEHICLE SEAT

(71) Applicant: TOYOTA BOSHOKU KABUSHIKI KAISHA, Aichi-ken (JP)

(72) Inventor: Tetsuro Umezawa, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 48 days.

(21) Appl. No.: 15/938,131

(22) Filed: Mar. 28, 2018

(65) Prior Publication Data
US 2018/0281643 A1    Oct. 4, 2018

(30) Foreign Application Priority Data

Apr. 3, 2017   (JP) ................................. 2017-073601

(51) Int. Cl.
| | |
|---|---|
| *B60N 2/22* | (2006.01) |
| *B60N 2/58* | (2006.01) |
| *B60N 2/90* | (2018.01) |
| *B60N 2/68* | (2006.01) |
| *B60N 3/10* | (2006.01) |

(Continued)

(52) U.S. Cl.
CPC ............ *B60N 2/5825* (2013.01); *B60N 2/22* (2013.01); *B60N 2/6009* (2013.01); *B60N 2/68* (2013.01); *B60N 2/682* (2013.01); *B60N 2/986* (2018.02); *B60N 3/101* (2013.01); *B60N 2/20* (2013.01)

(58) Field of Classification Search
CPC ........ B60N 2/5825; B60N 2/986; B60N 2/20; B60N 2/99; B60N 2/22; B60N 2/6009; B60N 2/68; B60N 2/682

USPC .................................................. 297/452.38
See application file for complete search history.

(56) References Cited

U.S. PATENT DOCUMENTS

| | | | | |
|---|---|---|---|---|
| 3,103,630 A | * | 9/1963 | Pitts ......................... | B60N 2/79 455/346 |
| 2014/0110975 A1 | * | 4/2014 | Tsuchida ................ | B60N 3/002 297/135 |

(Continued)

FOREIGN PATENT DOCUMENTS

| | | | |
|---|---|---|---|
| JP | 2010221939 | * | 10/2010 |
| JP | 2016-88367 | | 5/2016 |

OTHER PUBLICATIONS

Office Action issued in China Counterpart Patent Appl. No. 201820455248.0, dated Sep. 25, 2018, along with an English translation thereof.

*Primary Examiner* — Mark R Wendell
(74) *Attorney, Agent, or Firm* — Greenblum & Bernstein, P.L.C.

(57) ABSTRACT

A vehicle seat including: a decorative body attached to a side portion of a seat cushion and including a first locking portion provided to a rear side and a second locking portion provided to a front side; and a cushion side frame including a first locked portion and a second locked portion, wherein the first locking portion is configured to restrict the decorative body from moving in a seat width direction and allow a front end portion side of the decorative body to be pivoted in an upper and lower direction about the first locked portion when the first locking portion is locked to the first locked portion from the front side, and wherein the second locking portion is configured to be locked to the second locked portion from an upper side when the front end portion side of the decorative body is pivoted downward.

8 Claims, 11 Drawing Sheets

(51) Int. Cl.
*B60N 2/60* (2006.01)
*B60N 2/20* (2006.01)

(56) References Cited

U.S. PATENT DOCUMENTS

| | | | |
|---|---|---|---|
| 2016/0152191 A1* | 6/2016 | Fukatsu | B60R 11/00 |
| | | | 297/188.04 |
| 2018/0147960 A1* | 5/2018 | Nakao | B60N 2/5883 |
| 2018/0272954 A1* | 9/2018 | Yurko | A47L 7/0076 |
| 2018/0281644 A1* | 10/2018 | Okazaki | B60N 2/68 |

* cited by examiner

VEHICLE SEAT

CROSS-REFERENCE TO RELATED APPLICATIONS

This application claims priority from Japanese Patent Application No. 2017-073601 filed on Apr. 3, 2017, the entire contents of which are incorporated herein by reference.

TECHNICAL FIELD

The disclosure relates to a vehicle seat.

BACKGROUND

There is a vehicle seat in which a shield serving as a decorative member is attached to a side portion of a seat cushion. In a seat cushion of an automobile seat disclosed in JP-A-2016-88367, a shield is attached to side frames positioned on left and right side portions of a cushion frame while being moved in a left and right direction. Specifically, fixing leg portions provided on an inner side (seat side) portion of the shield are attached in a state of being positioned by being inserted from the left and right direction into through-holes formed in the side frames and penetrating in the left and right direction.

In the above related art, it is necessary to secure a sufficient space in the left and right side portions of the seat cushion when attaching the shield to the seat cushion of the automobile seat. Since this automobile seat is mounted in a cabin and fixed on a floor after the shield is attached to the seat cushion, it is not necessary to consider whether a space between left and right walls in the cabin is sufficiently secured for attachment or the like. On the other hand, depending on a vehicle seat, there are cases where it is required to attach the shield in a situation where a sufficient space cannot be secured in the left and right side portions of the seat cushion. For example, it may be required to attach the shield after attaching the seat to the floor at some request. In such a case, there is a problem that the related art is difficult to deal with such a situation.

SUMMARY

An object to be achieved by the disclosure is to provide a vehicle seat having a decorative body such as a shield that can be attached to left and right side portions of a seat cushion even in a situation where a sufficient space in the left and right direction cannot be secured in the left and right side portions of the seat cushion.

According to an aspect of the disclosure, there is provided a vehicle seat including: a decorative body extending in a front and rear direction of the seat and attached to a side portion of a seat cushion; and a cushion side frame serving as a side framework of one side of the seat cushion which is closer to the decorative body than another side of the seat cushion, wherein the decorative body includes a first locking portion provided to a portion of the decorative body corresponding to a rear end portion side of the seat cushion and a second locking portion provided to a portion of the decorative body corresponding to a front end portion side of the seat cushion, wherein the cushion side frame includes a first locked portion provided to a portion of the cushion side frame corresponding to the first locking portion and a second locked portion provided to a portion of the cushion side frame corresponding to the second locking portion, wherein the first locking portion is configured to restrict the decorative body from moving in a seat width direction with respect to the seat cushion and allow a front end portion side of the decorative body to be pivoted in an upper and lower direction about the first locked portion when the first locking portion is locked to the first locked portion from the front side, and wherein the second locking portion is configured to be locked to the second locked portion from an upper side when the front end portion side of the decorative body is pivoted downward about the first locked portion.

Accordingly, the decorative body can be attached to the seat cushion the decorative body by locking the first lock portion to the first locked portion from the front side, and pivoting the front end portion side of the decorative body downward about the first locked portion so as to lock the second locking portion to the second locked portion in a state where the decorative body is restricted from moving in the seat width direction with respect to the side portion of the seat cushion. In this manner, it is possible to provide the vehicle seat having the decorative body, in which the decorative body can be attached to the vehicle seat even in a situation where a sufficient space is not secured at the side portion in the seat width direction of the seat cushion.

DETAILED DESCRIPTION

FIGS. 1 to 12 show an automobile seat 1 according to an embodiment of the disclosure. In each of the figures, respective directions of an automobile and the automobile seat 1 when the automobile seat 1 is mounted in a cabin of the automobile are indicated by arrows. In the following, the description relating to directions is made with reference to these directions.

Figure 1:
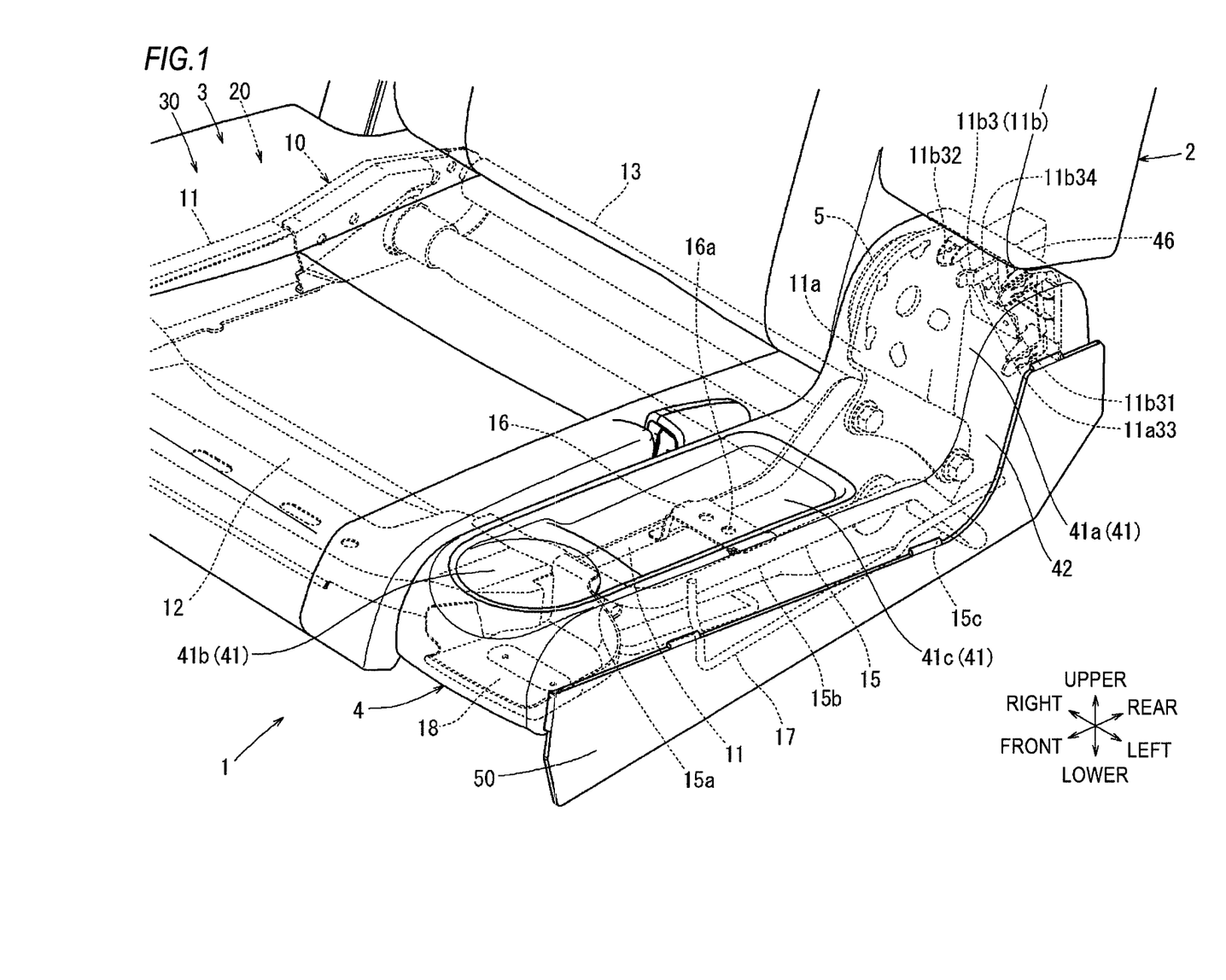
FIG. 1 is a perspective view showing a schematic configuration of a vehicle seat according to an embodiment of the disclosure.

As shown in FIG. 1, the automobile seat 1 is configured as a right divided seat of two adjacent divided seats which are divided by 5:5 on the left and right sides of the same row in a rear side seat of an automobile. The automobile seat 1 includes a seat back 2 serving as a backrest of a seated person and a seat cushion 3 serving as a seating part. Here, the automobile seat 1 corresponds to the "vehicle seat" in the claims.

Lower end portions on both left and right sides of the seat back 2 are connected to rear end portions on both left and right sides of the seat cushion 3 via recliners 5, respectively. The seat cushion 3 is connected on a floor of a vehicle. The automobile seat 1 is configured such that a resin center console 4 having a recessed cup holder portion 41b is provided adjacent to the left side (the side adjacent to the left divided seat (not shown)) of the seat cushion 3. Here, the center console 4 corresponds to the "decorative body" in the claims.

Figure 2:
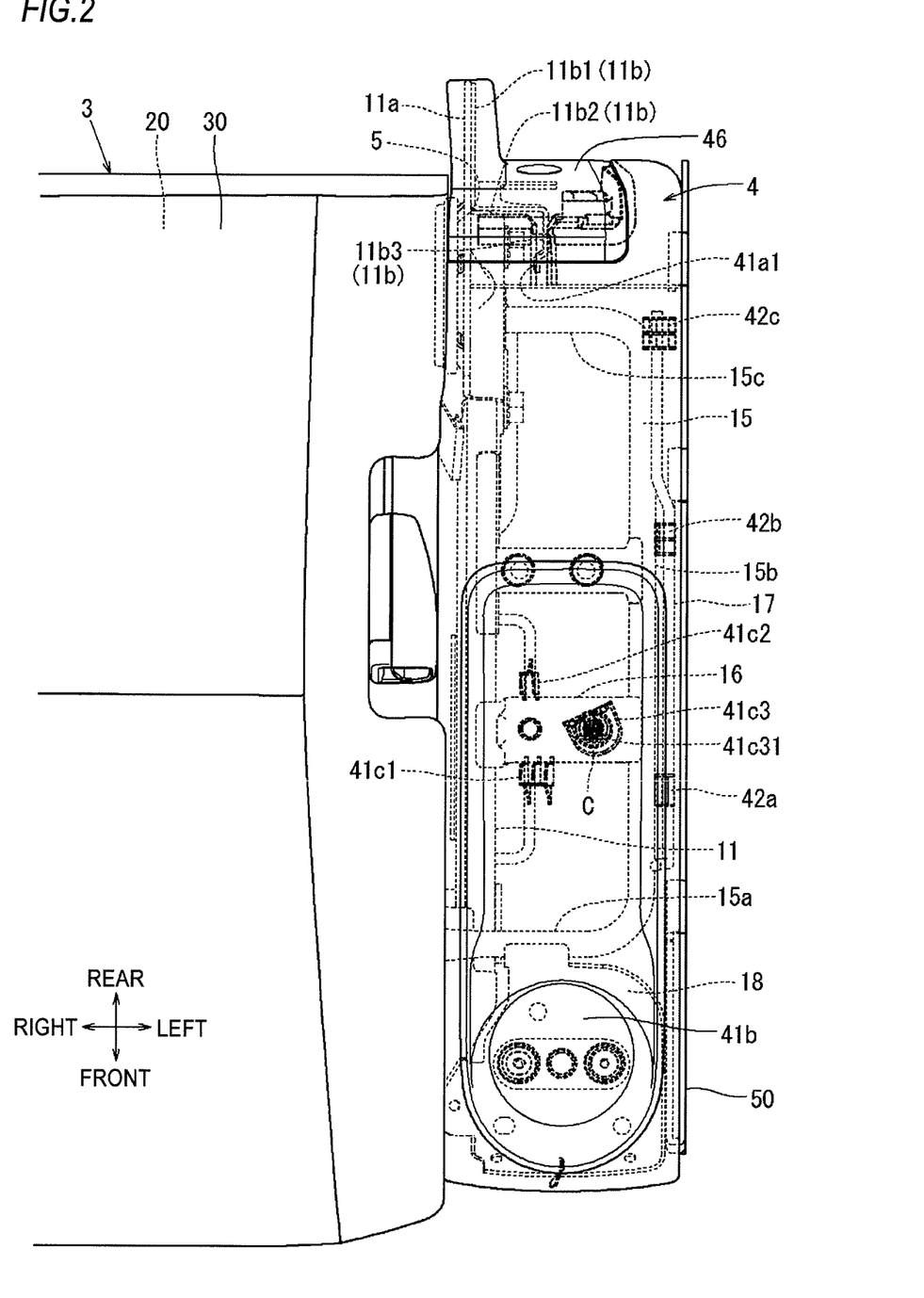
FIG. 2 is a plan view showing an adjacent portion between a seat cushion and a center console.
Figure 3:
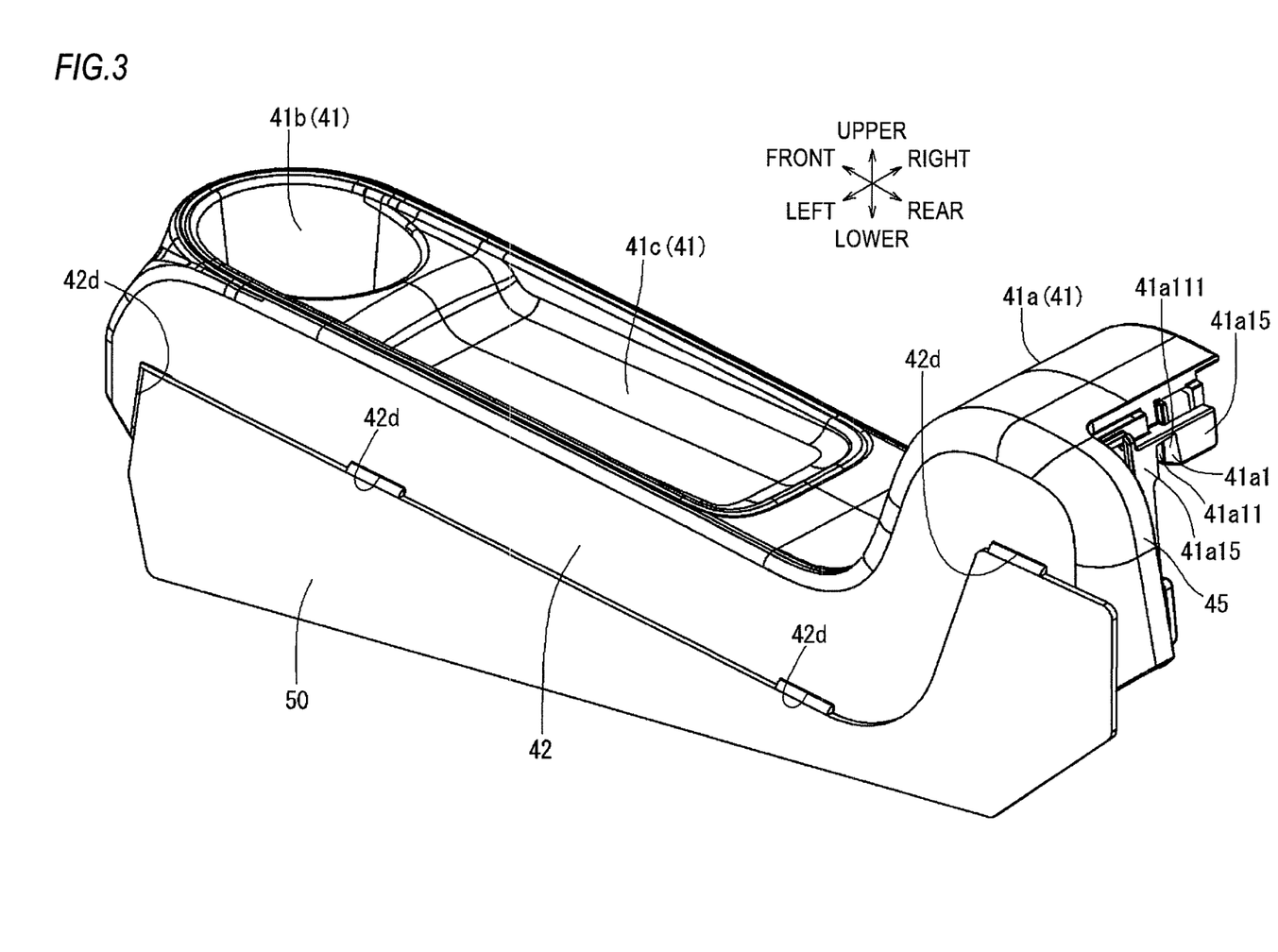
FIG. 3 is a perspective view of the outer side of the center console, as viewed obliquely from above.

As shown in FIGS. 1 and 2, the seat cushion 3 includes a metallic cushion frame 10 forming its framework, and a foam urethane cushion pad 20 disposed on an upper portion of the cushion frame 10 and elastically receiving the load of a seated person. Further, the seat cushion 3 includes a fabric cushion cover 30 that covers the entire surface of the cushion pad 20 to form a design surface of the seat cushion 3.

The cushion frame 10 includes a pair of left and right side frames 11 forming a side framework, a front panel 12 forming a front framework and connected in a bridging manner from the upper side between front portions of the side frames 11, and a rear pipe 13 forming a rear framework and connected in a bridging manner between rear portions of the side frames 11. The side frames 11, the front panel 12 and the rear pipe 13 form a substantially rectangular frame shape in a plan view. Further, a plurality of pad support wires (not shown) for supporting the cushion pad 20 from the lower side at a plurality of positions in a width direction is disposed between the front panel 12 and the rear pipe 13.

Figure 8:
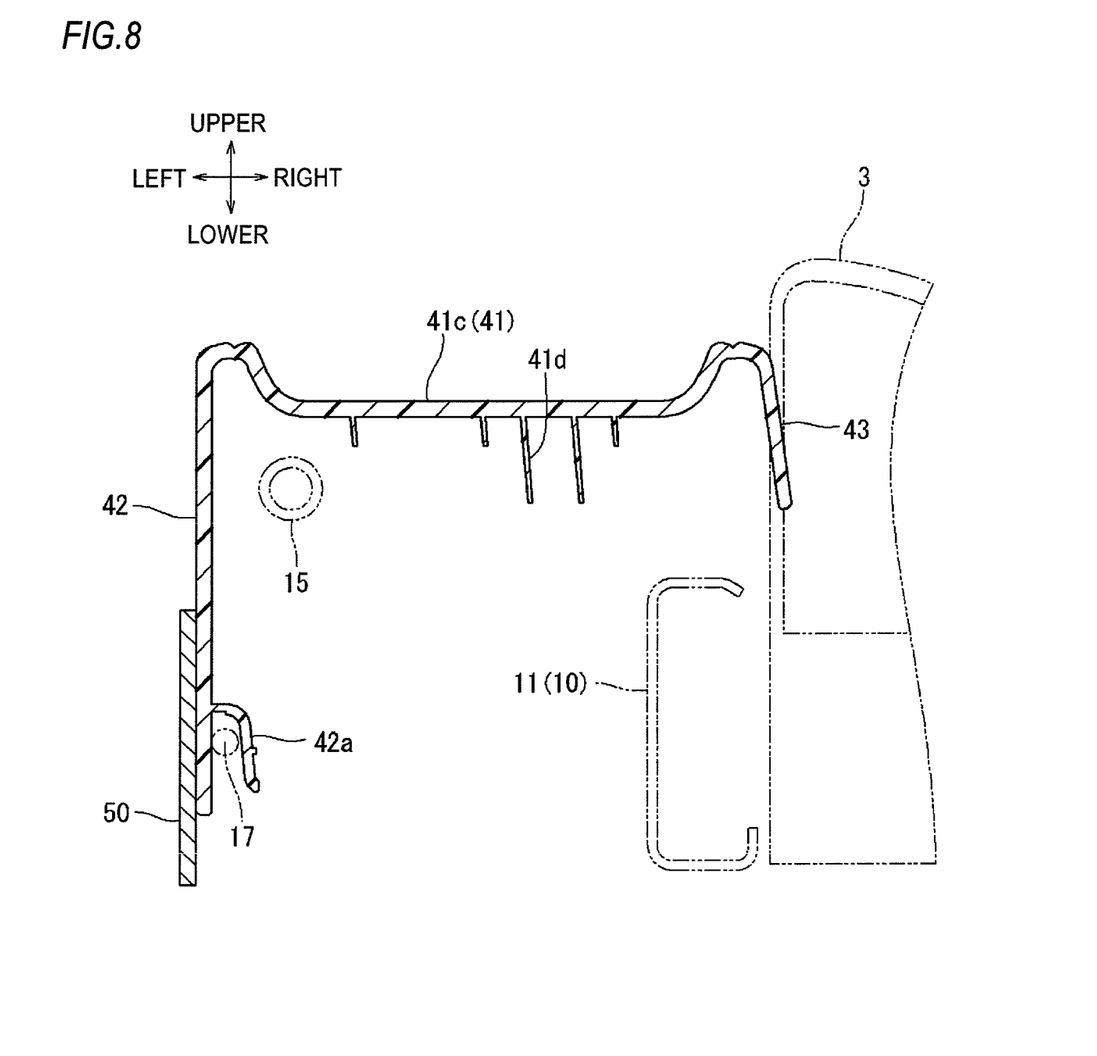
FIG. 8 is a sectional view taken along an arrow line VIII-VIII in FIG. 6.

In the cushion frame 10, the right side frame 11 is disposed at a position within a lateral width region of the seat cushion 3. However, as shown in FIGS. 2 and 8, the left side frame 11 is disposed at an offset position away from the lateral width region of the seat cushion 3 to the left side and to a region just below the center console 4. Further, a support frame 15 is disposed on the cushion frame 10. The support frame 15 is made of a round pipe material bent into a substantially U shape in a plan view so as to protrude from the left side frame 11 to the left side.

As shown in FIGS. 1 and 2, the support frame 15 has a substantially U shape in a plan view, which is formed by a front arm portion 15a that extends to the left side from a front region of the left side frame 11, an extended portion 15b that extends to be bent to the rear side from an end portion of the front arm portion 15a extended to the left side, and a rear arm portion 15c that extends to be bent to the right side from an end portion of the extending portion 15b extended to the rear side. In the support frame 15, the front arm portion 15a passes over an upper surface portion of the left side frame 11 and is welded in a state of being brought into contact with an upper surface portion on the left side of the front panel 12. Further, the rear arm portion 15c is inserted and welded to a rear portion of the left side frame 11 from the left side. In this manner, the support frame 15 is integrally coupled to the cushion frame 10. A cup holder support frame 18 for supporting a bottom surface portion of the cup holder portion 41b of the center console 4 is disposed between the front arm portion 15a of the support frame 15 and a front end portion side of the front panel 12. Further, two screw holes are formed side by side in the left and right direction in the cup holder support frame 18. The screw holes are formed at positions corresponding to screw holes 41b1 formed in the bottom surface portion of the cup holder portion 41b (to be described later). Here, the left side frame 11 corresponds to the "cushion side frame" in the claims.

As shown in FIGS. 1 and 2, a support plate 16 serving as a support for supporting an upper surface portion 41 of the center console 4 from the lower side is arranged in a bridging manner between the extended portion 15b of the support frame 15 and the upper surface portion of the left side frame 11. As shown in FIG. 1, the support plate 16 is formed in a bent plate shape which rises upright from a top of the upper surface portion of the side frame 11 and is bent to extend substantially horizontally toward the extended portion 15b of the support frame 15 from that portion. At the left side of the upper surface of the support plate 16, a clip hole 16a into which a clip C attached to the center console 4 (to be described later) is inserted and supported is formed to penetrate in the upper and lower direction. Here, the support plate 16 corresponds to the "second locked portion" and "strip-like plate material" in the claims. Further, the clip hole 16a corresponds to the "through-hole" in the claims.

Further, as shown in FIGS. 1, 2 and 8, a fixing wire 17 extending from the extended portion 15b to the lower left side and connected to a right side surface portion of a left side surface portion 42 of the center console 4 is integrally coupled to the support frame 15. A front hook 42a, a central hook 42b and a rear hook 42c (to be described later) disposed on the right side surface portion of the left side surface portion 42 of the center console 4 are fitted and attached to the fixing wire 17. Here, the fixing wire 17 corresponds to the "third locked portion" and "wire" in the claims.

Figure 10:
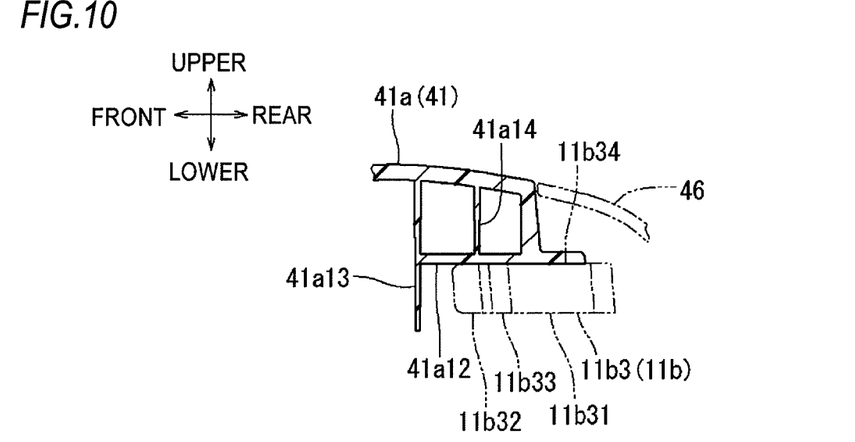
FIG. 10 is a sectional view taken along an arrow line X-X in FIG. 5.
Figure 12:
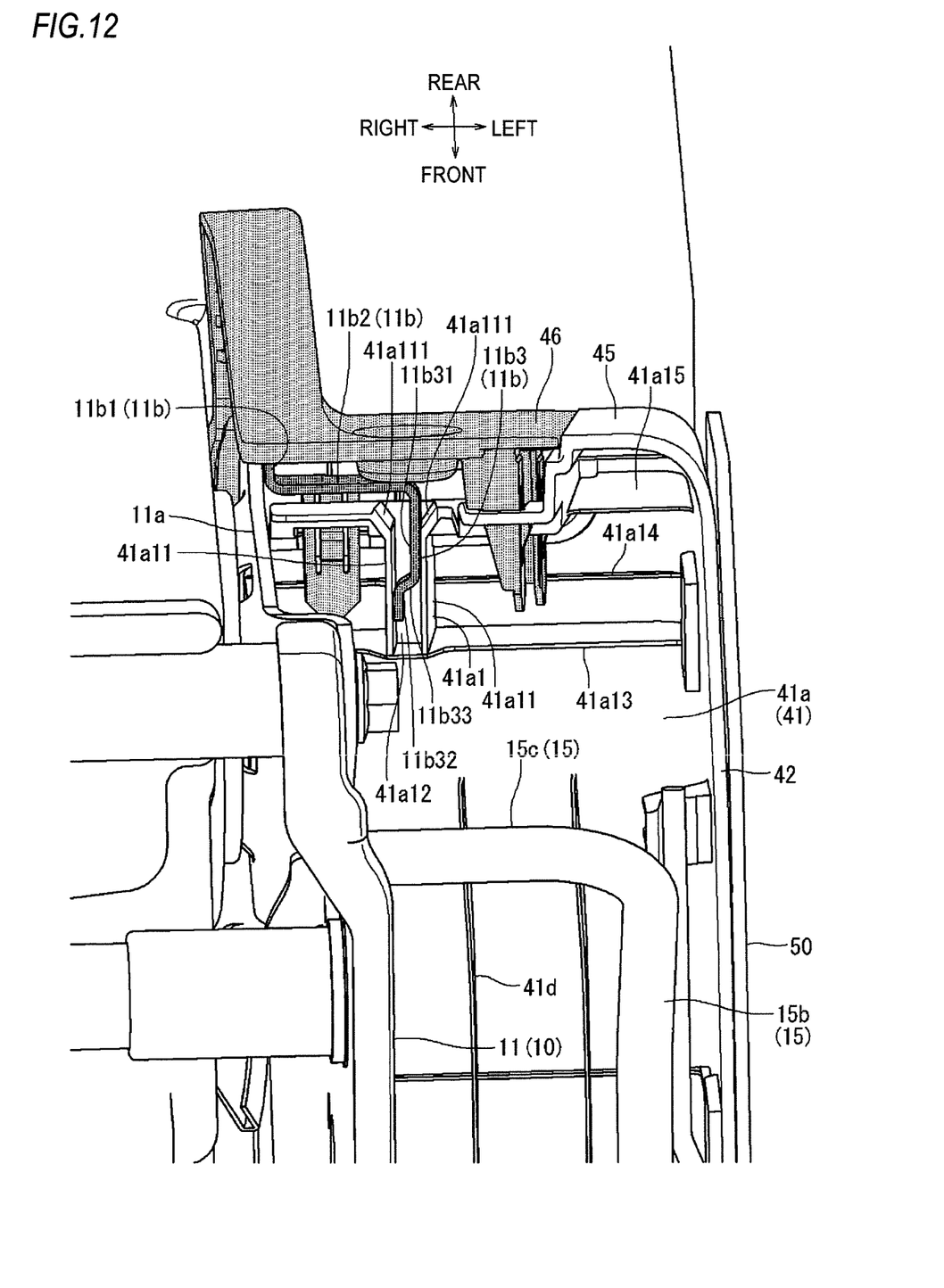
FIG. 12 is a view showing a state in which a rear part of the center console is attached to the seat cushion, as viewed from below.

As shown in FIGS. 1, 2, 10 and 12, a lower arm 11a made of a thick plate metal is fastened and fixed to a rear end portion of each side frame 11 with a bolt and a nut. The lower arm 11a is attached to lower end portions on the left and right sides of a back frame forming a framework of the seat back 2 via the recliner 5. A positioning member 11b is disposed on a rear end portion side on the upper side of the left lower arm 11a. The positioning member 11b is formed in a bent plate shape which has a base portion 11b1 extending toward the front side along a left surface of the lower arm 11a, a rising portion 11b2 rising upright from a front end portion of the base portion 11b1 toward the left side, and a positioning portion 11b3 bent at a right angle from a left end portion of the rising portion 11b2 toward the front side. As shown in FIGS. 10 and 12, the positioning portion 11b3 extending toward the front side has a shape in which a front end portion is bent in a crank shape and a rear wall portion 11b31 and a front wall portion 11b32 parallel to each other are connected by a connecting wall portion 11b33, as viewed in a plan view. Further, the positioning portion 11b3 is formed in a substantially rectangular shape having long sides in the front and rear direction in a side view and an upper end surface portion 11b34 thereof is formed to extend substantially horizontally forward. As the positioning portion 11b3 of the positioning member 11b is inserted into a projecting piece reception portion 41a1 of the center console 4 (to be described later), the rear side of the center console 4 is positioned in the left and right direction when the center console 4 is attached to the cushion frame 10. Here, the positioning portion 11b3 and the upper end surface portion 11b34 correspond to the "first locked portion" and the "upper end portion" in the claims, respectively.

As shown in FIG. 1, at a position in the width direction contained in the lateral width region of the seat back 2, the center console 4 is provided side by side with the seat cushion 3 in a state of being adjacent to the seat cushion 3 in the width direction. Specifically, the lateral width of the seat cushion 3 is substantially aligned with the seat back 2 on the right side, but is shorter than the seat back 2 on the left side. Further, the center console 4 is disposed in a shortened empty region on the left side of the seat cushion 3, and the total lateral width of the center console 4 and the seat cushion 3 is substantially the same as the lateral width of the seat back 2. The center console 4 is integrally assembled with the cushion frame 10 forming a framework of the seat cushion 3.

As shown in FIGS. 3 to 6, the center console 4 includes the upper surface portion 41 extending in the left and right direction and having a bulging portion 41a. The bulging portion 41a extends while slightly being inclined from the front end portion side toward the rear lower side and is bent and bulges upward at the rear end portion side. Further, the center console 4 has the left side surface portion 42 extending downward from a left end portion of the upper surface portion 41 in a direction substantially perpendicular to the upper surface portion 41, and a right side surface portion 43 extending obliquely rightward and downward from a right end portion of the upper surface portion 41. Furthermore, the center console 4 has a front surface portion 44 extending obliquely forward and downward from a front end portion of the upper surface portion 41, and a rear surface portion 45 extending obliquely rearward and downward from a right rear end portion of the upper surface portion 41.

The cup holder portion 41b recessed downward is provided on a front end portion side of the upper surface portion 41, and an article storage portion 41c recessed downward in a pan shape is provided from a rear end portion of the cup holder portion 41b to a central portion in the front and rear direction of the upper surface portion 41. Two screw holes 41b1 are formed side by side in the left and right direction on a bottom surface portion of the cup holder portion 41b. The article storage portion 41c is formed in a substantially rectangular shape having long sides in the front and rear direction in a top view. A bottom surface portion of the article storage portion 41c is formed to be shallower (on the upper side) than the bottom surface portion of the cup holder portion 41b. On a lower surface side of the bottom surface portion of the article storage portion 41c, a front columnar portion 41c1, a rear columnar portion 41c2 and a clip support portion 41c3 corresponding to the "second locking portion" in the claims are disposed. Further, on a lower surface side of the bulging portion 41a of the upper surface portion 41, the projecting piece reception portion 41a1 corresponding to the "first locking portion" in the claims is disposed. On a lower surface side of the upper surface portion 41 from the article storage portion 41c to the bulging portion 41a, a grid-like rib 41d for securing rigidity is disposed so as to extend downward.

As shown in FIGS. 4 to 7, the projecting piece reception portion 41a1 is configured in such manner that a member having a substantially U-shaped cross section whose lower side is opened is formed by connecting upper end portions of a pair of side plate portions 41a11 arranged to extend in the front and rear direction while being substantially perpendicular to the upper surface portion 41 and keeping parallelism to each other by an upper plate portion 41a12 and is supported in a state where the upper plate portion 41a12 is separated downward from the upper surface portion 41. Specifically, the upper end portion side of an extended portion 41a16 of the left side plate portion 41a11 extended to the upper side is connected to the lower surface side of the upper surface portion 41. Further, front end portions of the pair of side plate portions 41a11 are supported by a front support plate 41a13, rear end portions thereof are supported by a rear support plate 41a15, and a center portion thereof in the front and rear direction is supported by a central support plate 41a14. The front support plate 41a13 is erected to extend downward substantially perpendicularly to the lower surface of the upper surface portion 41 and is connected to the front end portions of the pair of side plate portions 41a11 so as to close the cross section. The rear support plate 41a15 is erected to extend downward substantially perpendicularly to the lower surface of the upper surface portion 41 and is divided into two parts at the lower side from the upper plate portion 41a12. The two parts of the rear support plate 41a15 are connected to a rear end portion of the left side plate portion 41a11 and a rear end portion of the right side plate portion 41a11, respectively. The central support plate 41a14 is erected to extend downward substantially perpendicularly to the lower surface of the upper surface portion 41. A lower end portion of the central support plate 41a14 is connected to an upper surface of the upper plate portion 41a12, and a left end portion thereof is connected to a right surface of the extended portion 41a16. In this manner, the substantially U-shaped member configured by the pair of side plate portions 41a11 and the upper plate portion 41a12 has a cross section which is opened at the rear end portion and closed at the front end portion. Meanwhile, on the rear end portion side of the pair of side plate portions 41a11, an expanded opening portion 41a111 whose opening is widened in the left and right direction toward the rear side is formed. The expanded opening portion 41a111 is provided for making it easy for the positioning portion 11b3 to enter between the pair of side plate portions 41a11 when the projecting piece reception portion 41a1 is locked to the positioning member 11b. Here, the projecting piece reception portion 41a1 corresponds to the "first locking portion" in the claims. Further, the side plate portions 41a11 and the upper plate portion 41a12 correspond to the "side wall portion" and the "upper wall portion" in the claims, respectively.

As shown in FIGS. 2, 4 to 6, the front columnar portion 41c1 and the rear columnar portion 41c2 are provided for positioning the center console 4 in the front and rear direction with respect to the support plate 16 of the cushion frame 10. At a position slightly to the right of the center in the left and right direction on the lower surface side of the upper surface portion 41 of the center console 4 corresponding to the front end portion of the support plate 16, the front columnar portion 41c1 extends downward at a right angle to the upper surface portion 41. Specifically, the front columnar portion 41c1 has a structure in which front end portions of three front longitudinal members 41c11 that are plate members having substantially the same rectangular shape are connected by a front lateral member 41c12 that is a plate member. Here, the three front longitudinal members 41c11 extend downward at a right angle to the upper surface portion 41, are parallel to each other and have long sides in the upper and lower direction. Further, a chamfered portion 41c111 is formed at a rear lower corner portion of each front longitudinal member 41c11. The chamfered portions 41c111 are provided for guiding rear surfaces of the front longitudinal members 41c11 so as to easily come into contact with the front end portion of the support plate 16 when a front end portion side of the center console 4 is pivoted downward about the positioning portion 11b3 with which the projecting piece reception portion 41a1 is in contact.

At a position slightly to the right of the center in the left and right direction on the lower surface side of the upper surface portion 41 of the center console 4 corresponding to the rear end portion of the support plate 16, that is, at a position facing the front columnar portion 41c1, the rear columnar portion 41c2 extends downward at a right angle to the upper surface portion 41. Specifically, the rear columnar portion 41c2 has a structure in which rear end portions of two rear longitudinal members 41c21 that are plate members having substantially the same rectangular shape are connected by a rear lateral member 41c22 that is a plate member. Here, the two rear longitudinal members 41c21 extend downward at a right angle to the upper surface portion 41, are parallel to each other and have long sides in the upper and lower direction. Further, a chamfered portion 41c211 is formed at a front lower corner portion of each rear longitudinal member 41c21. The chamfered portions 41c211 are provided for guiding front surfaces of the rear longitudinal members 41c21 so as to easily come into contact with the rear end portion of the support plate 16 when a front end portion side of the center console 4 is pivoted downward about the positioning portion 11b3 with which the projecting piece reception portion 41a1 is in contact. The front longitudinal members 41c11 are formed to be longer in the upper and lower direction than the rear longitudinal member 41c21. This is intended to make the fitting smooth in such a manner that the front columnar portion 41c1 farther away from the pivot center first comes into contact with the support plate 16 when the front end portion side of the center console 4 is pivoted downward about the positioning portion 11b3 with which the projecting piece reception portion 41a1 is in contact. The length between the rear end portion of the front longitudinal member 41c11 and the front end portion of the rear longitudinal member 41c21 is set to be slightly longer than the length of the support plate 16 in the front and rear direction.

Figure 11:
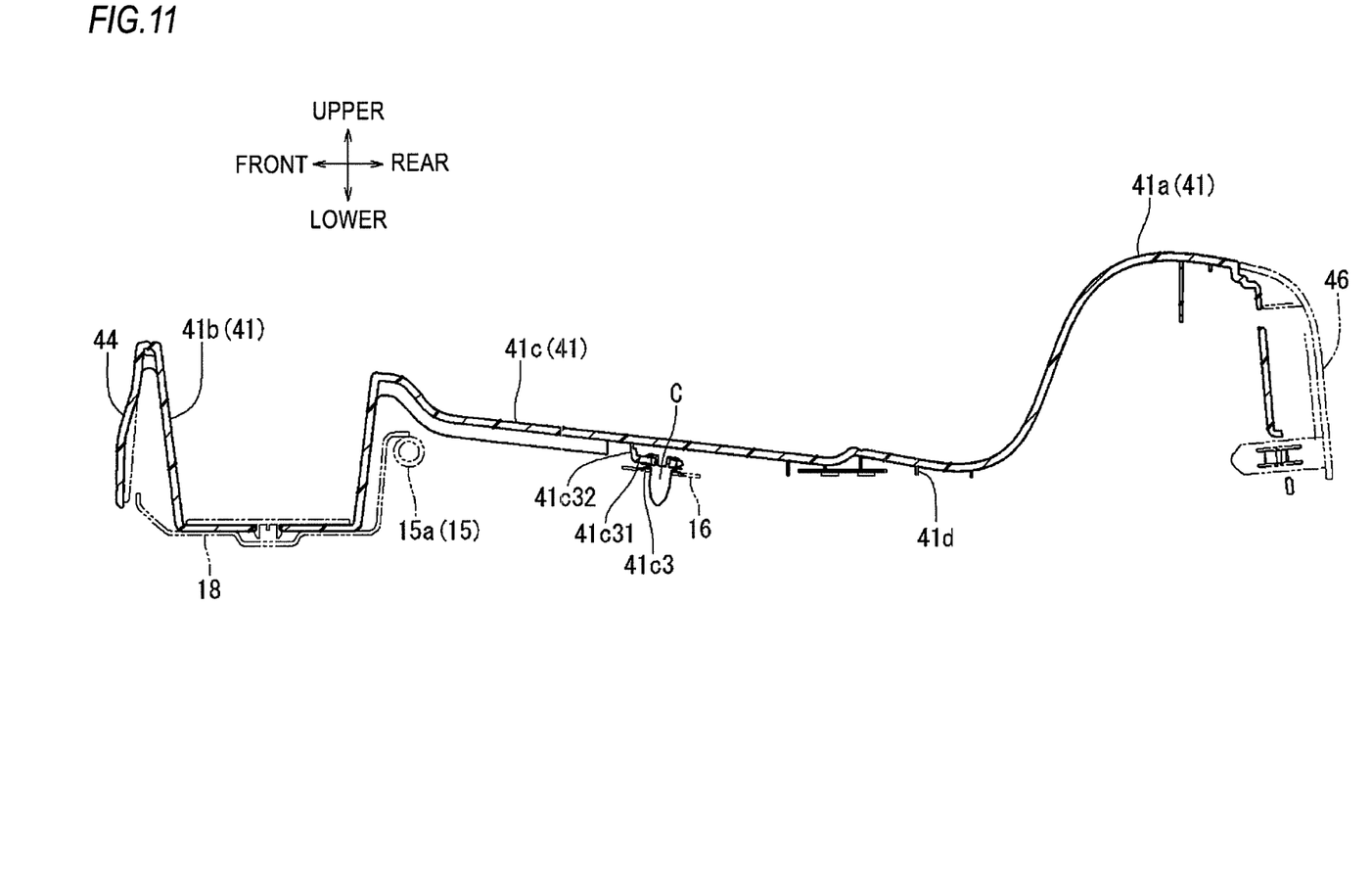
FIG. 11 is a sectional view taken along an arrow line XI-XI in FIG. 5.

The clip support portion 41c3 is disposed on the left side of the front columnar portion 41c1 and the rear columnar portion 41c2 where the clip C having an elastically deformable projection shape can be fitted into the clip hole 16a of the support plate 16. Specifically, as shown in FIG. 11, a clip seat 41c31 of the clip support portion 41c3 is formed by connecting a peripheral edge portion of the upper surface portion 41 excluding the rear end portion side to the lower surface of the upper surface portion 41 by a standing wall portion 41c32 so that the clip seat 41c31 to which the clip C can be attached can be arranged to be parallel to the upper surface portion 41 at a position separated from the lower surface of the upper surface portion 41. A notch (not shown) for inserting the clip C is provided in the rear end portion of the clip seat 41c31. Here, the front columnar portion 41c1, the rear columnar portion 41c2 and the clip support portion 41c3 correspond to the "second locking portion" in the claims.

As shown in FIGS. 3 to 9, the left side surface portion 42 is formed substantially perpendicular to a general surface portion of the upper surface portion 41 excluding the cup holder portion 41b and the article storage portion 41c. On the right surface (surface on the side of the seat cushion 3) of the left side surface portion 42, three hooks which have a substantially L-shaped cross section opened downward and extending in the front and rear direction are provided at appropriately the same height position. Specifically, the front hook 42a is provided at a position corresponding to the center portion of the article storage portion 41c in the front and rear direction, the central hook 42b is provided at a position corresponding to the rear end portion of the article storage portion 41c, and the rear hook 42c is provided at a position corresponding to the bulging portion 41a. Further, a carpet 50 is attached to a lower end portion side of the left surface of the left side surface portion 42. Specifically, the carpet 50 is attached to the left side surface portion 42 in such a manner that protrusions 51 formed on an outer peripheral portion of the carpet 50 are passed through four rectangular holes 42d formed in the left side surface portion 42 from the left side and folded back along the left surface of the left side surface portion 42, and the folded portion is fixed to the left side surface portion 42 by a tacker. Here, the front hook 42a, the central hook 42b and the rear hook 42c correspond to the "third locking portion" and "hook" in the claims.

Figure 4:
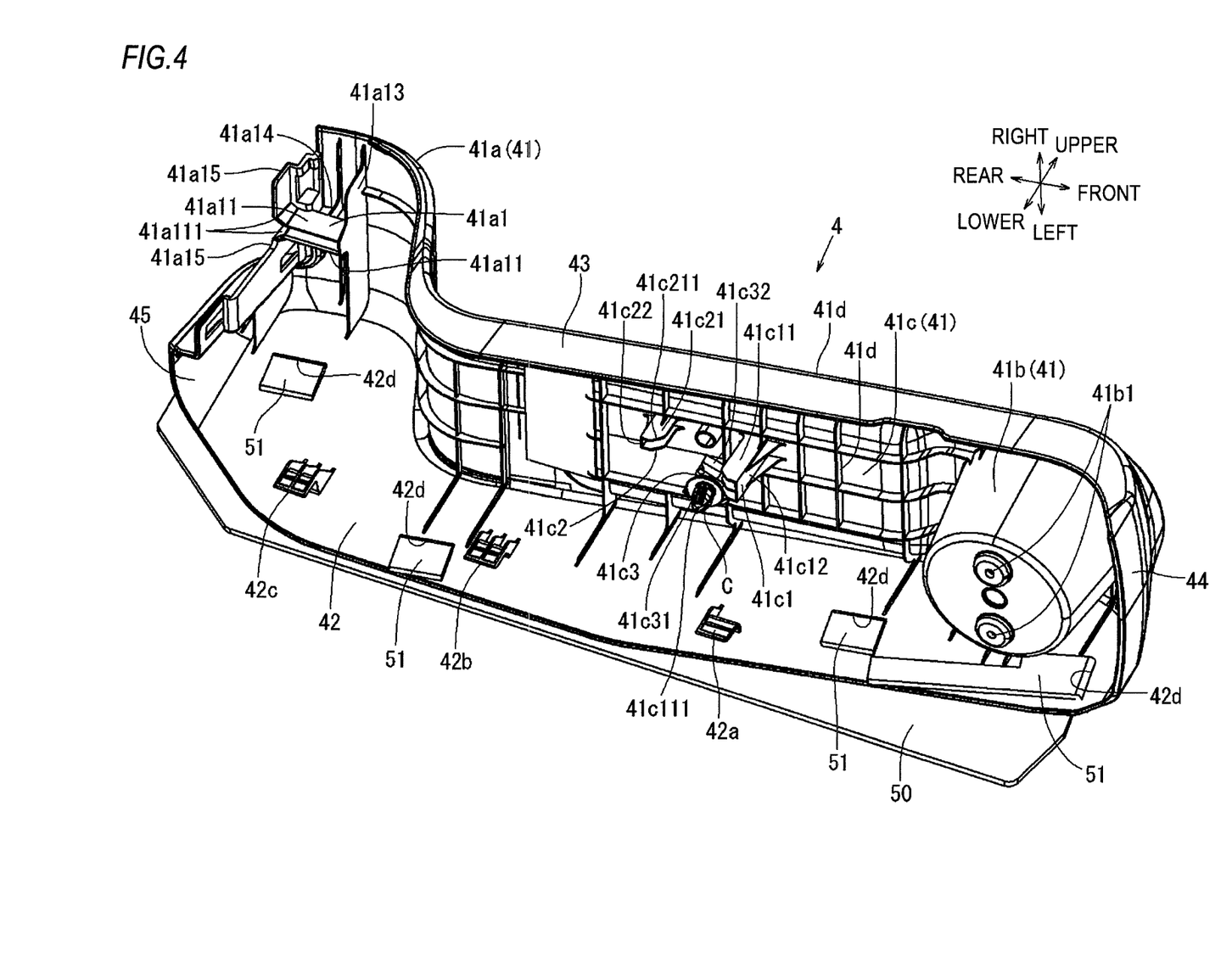
FIG. 4 is a perspective view of the inner side of the center console, as viewed obliquely from below.
Figure 5:
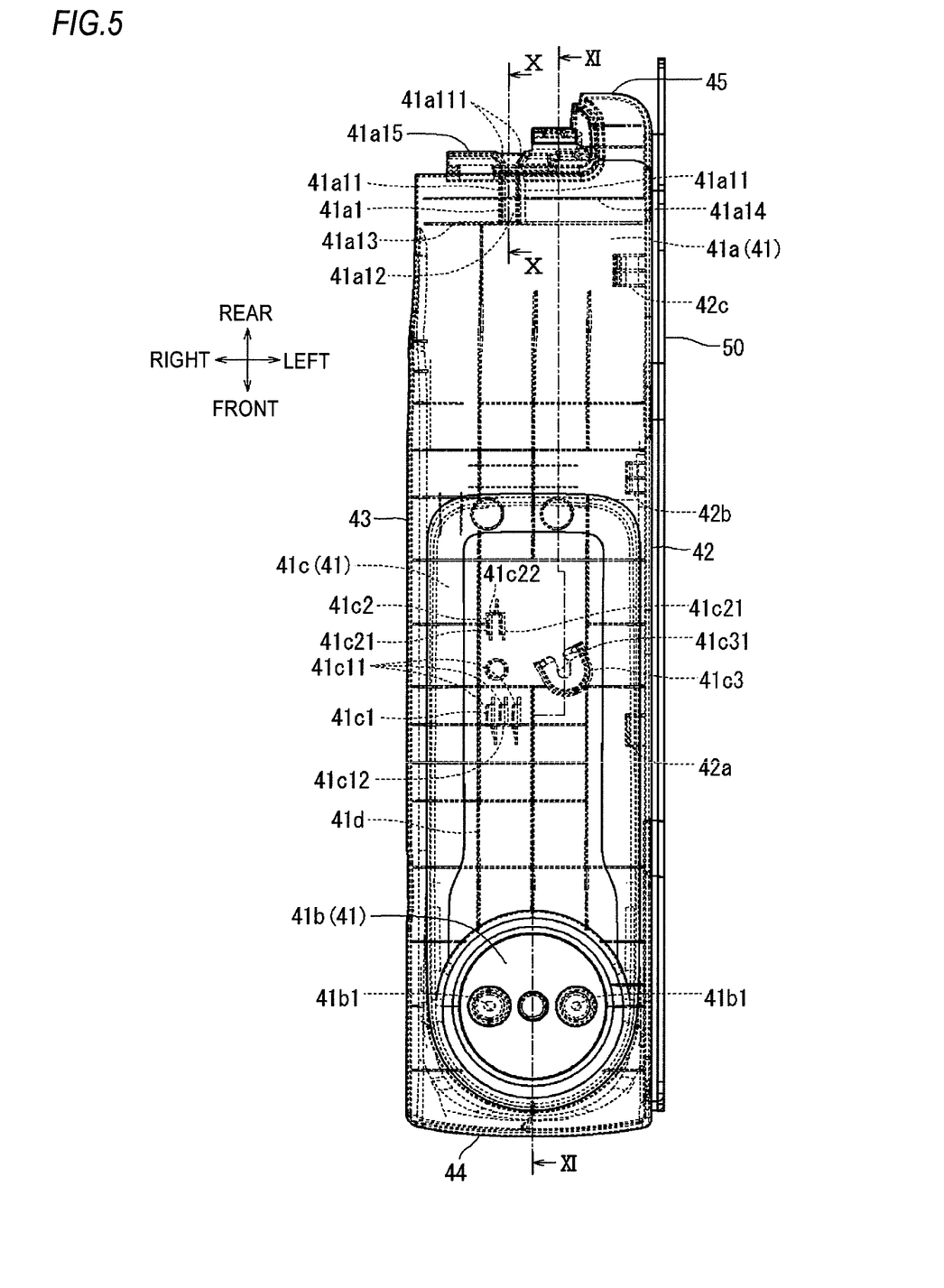
FIG. 5 is a plan view of the center console.
Figure 6:
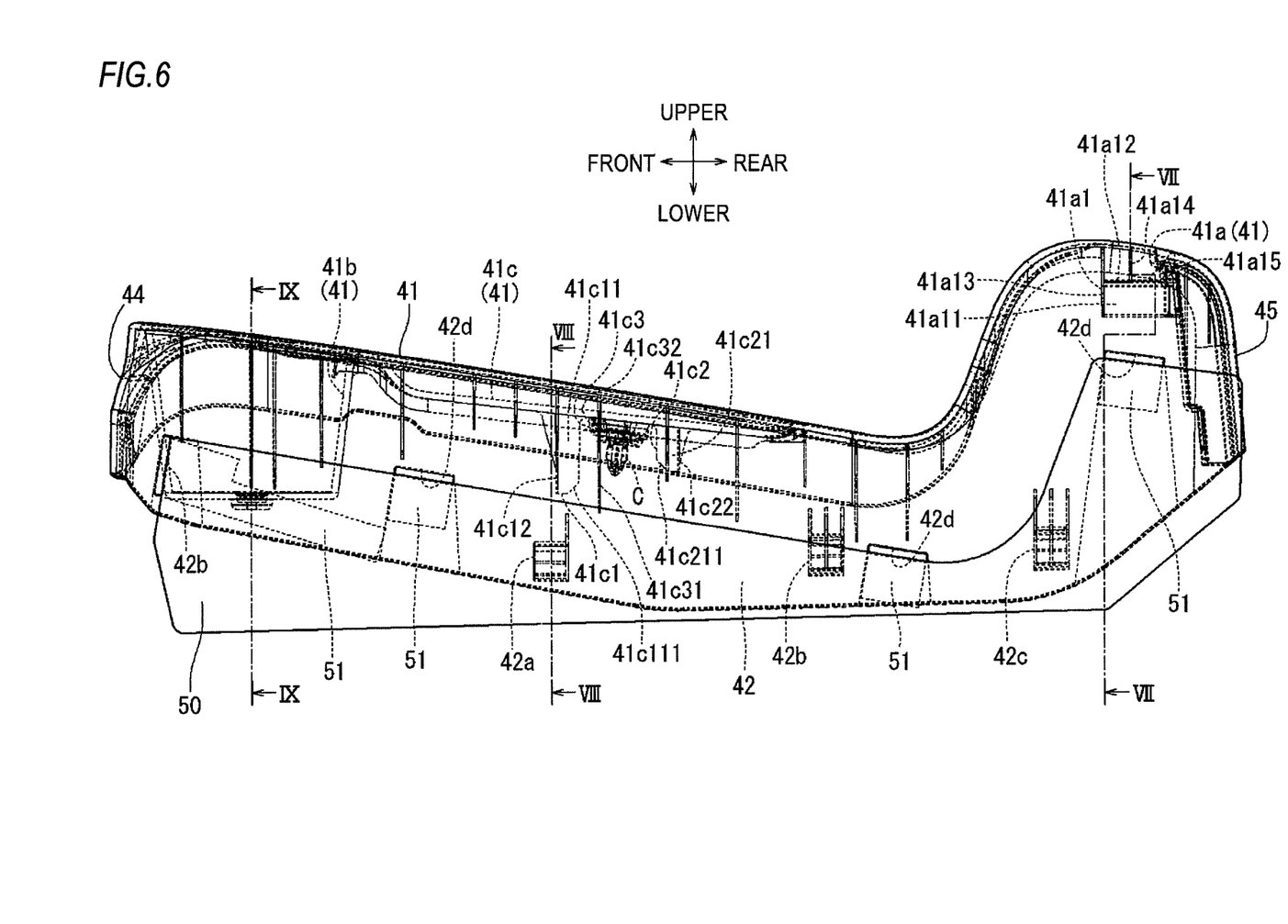
FIG. 6 is a side view of the center console.
Figure 7:
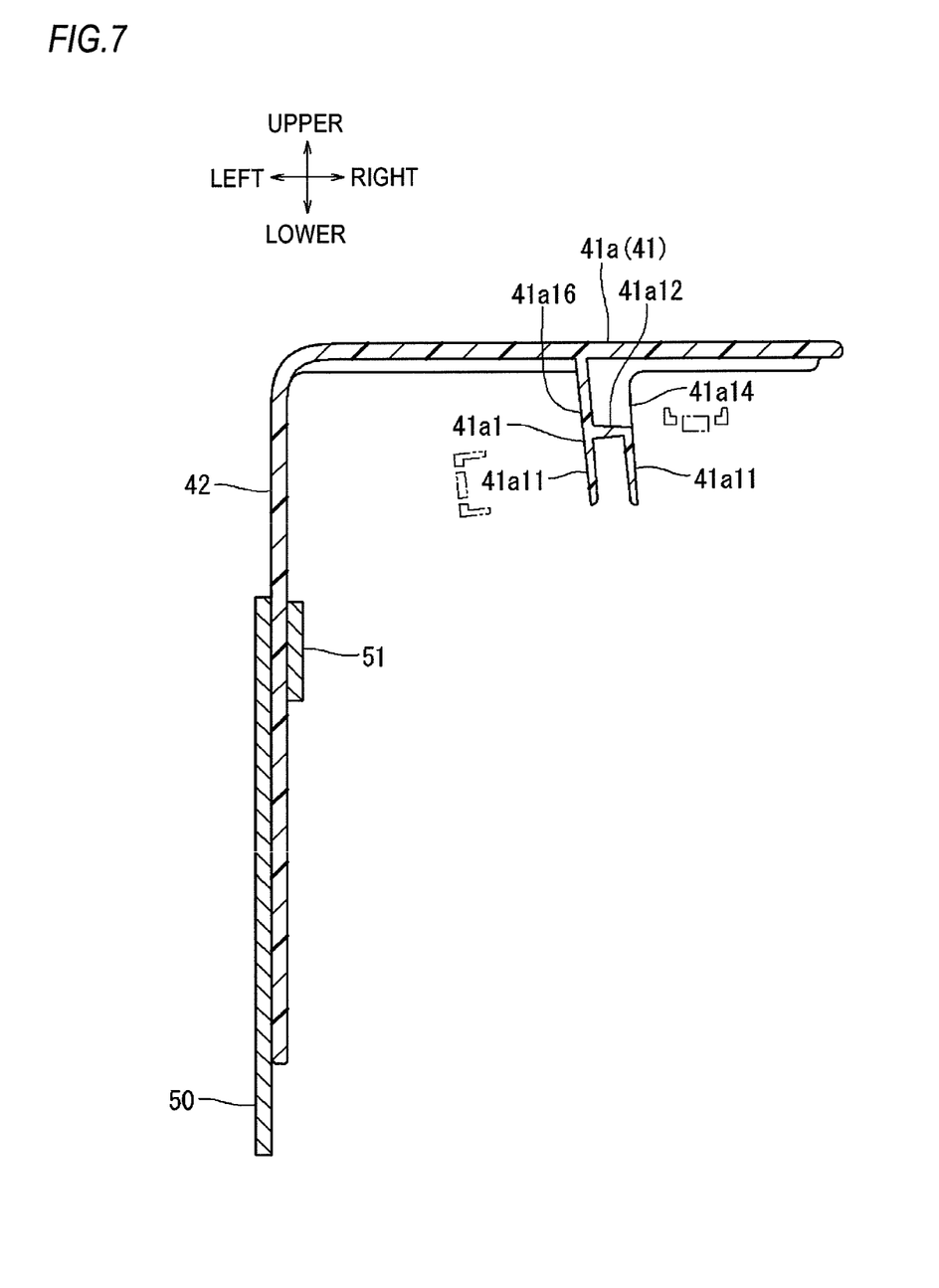
FIG. 7 is a sectional view taken along an arrow line VII-VII in FIG. 6.
Figure 9:
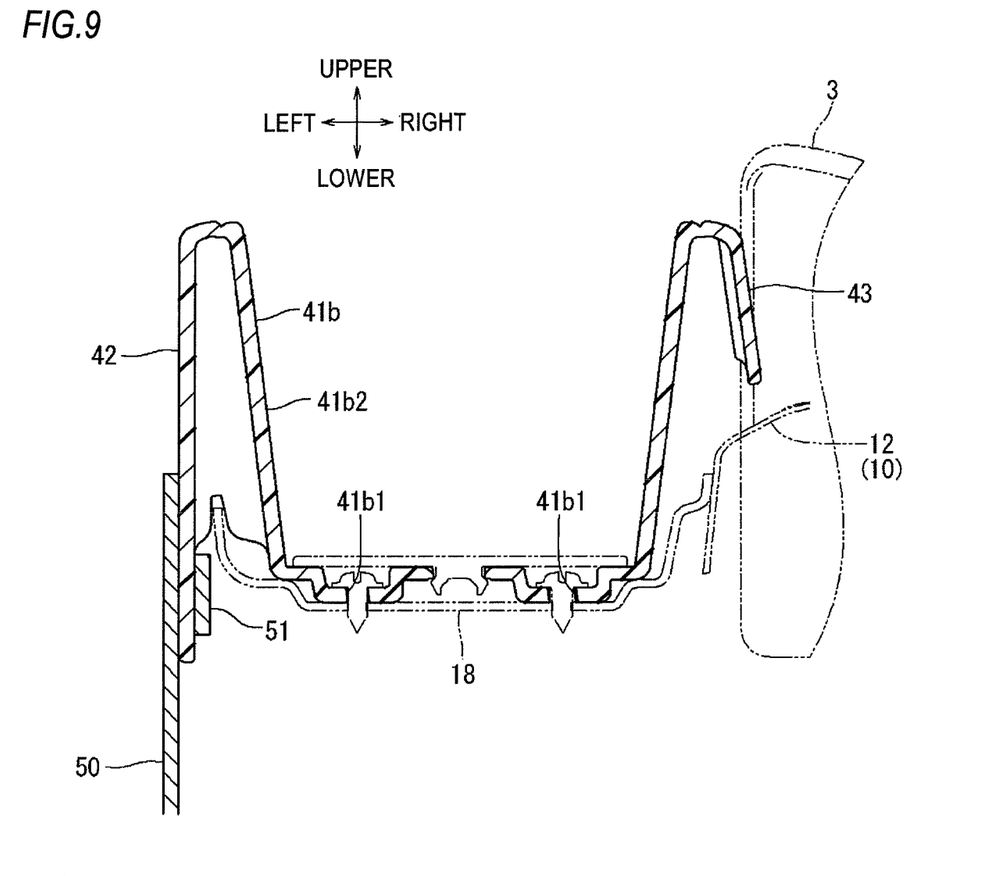
FIG. 9 is a sectional view taken along an arrow line IX-IX in FIG. 6.

As shown in FIGS. 4, 8 and 9, the right side surface portion 43 is inclined to the right lower side with respect to the general surface portion of the upper surface portion 41 excluding the cup holder portion 41b and the article storage portion 41c and is formed in a portion of the upper surface portion 41 excluding the bulging portion 41a. The length of the right side surface portion 43 in the upper and lower direction is about ⅓ of the length of the left side surface portion 42 in the upper and lower direction. When the center console 4 is attached to the seat cushion 3, the right side surface portion 43 is pressed against the cushion pad 20 of the seat cushion 3 with a slight interference.

A procedure for assembling the center console 4 to the seat cushion 3 will be described. First, the center console 4 is moved to the rear lower side in a state of being tilted so that its rear side is lowered. Thereby, the positioning portion 11b3 of the cushion frame 10 is inserted between the pair of side plate portions 41a11 of the projecting piece reception portion 41a1 of the center console 4. In this manner, the center console 4 is positioned in the left and right direction with respect to the seat cushion 3. Subsequently, in a state where the lower surface of the upper plate portion 41a12 of the projecting piece reception portion 41a1 is brought into contact with the upper end surface portion 11b34 of the positioning portion 11b3, the center console 4 is pivoted about the contact portion so that its front end portion side is lowered. Then, the chamfered portions 41c111 of the front columnar portion 41c1 of the center console 4 are brought into contact with the front end portion of the support plate 16 of the cushion frame 10. When the center console 4 is further pivoted, the rear end portion of the front longitudinal member 41c11 is brought into contact with the front end portion of the support plate 16. When the center console 4 is further pivoted, the chamfered portions 41c211 of the rear columnar portion 41c2 of the center console 4 are brought into contact with the rear end portion of the support plate 16. When the center console 4 is further pivoted, the front end portions of the rear longitudinal members 41c21 are brought into contact with the rear end portion of the support plate 16. In this manner, the center console 4 is positioned in the front and rear direction with respect to the seat cushion 3. In the process of sandwiching the support plate 16 from the front and rear sides by the front columnar portion 41c1 and the rear columnar portion 41c2, the clip C attached to the clip support portion 41c3 is fitted and fixed by being inserted into the clip hole 16a of the support plate 16. In this manner, the center console 4 is positioned in the upper and lower direction and assembled. Further, in parallel with the operation in which the clip C is fitted and fixed by being inserted into the clip hole 16a of the support plate 16, the front hook 42a, the central hook 42b and the rear hook 42c of the center console 4 are locked to the fixing wire 17 of the cushion frame 10 from the upper side. In this manner, the left side surface portion 42 of the center console 4 is positioned in the left and right direction and assembled. Then, screws are screwed into the screw holes 41b1 of the cup holder portion 41*b* of the center console 4, so that the center console 4 is fastened and fixed to the cup holder support frame 18. Finally, a rear lid 46 is attached to the right side of the rear end portion of the center console 4 to cover a connecting portion between the cushion frame 10 and the back frame from the rear side.

In the embodiments configured as described above, the following operational effects are achieved. The center console 4 is restricted from moving in the left and right direction with respect to a side portion of the seat cushion 3 by locking the projecting piece reception portion 41*a*1 to the positioning portion 11*b*3 from the front side. Further, the center console 4 is restricted from moving in the front and rear direction when the front end portion side of the center console 4 is pivoted downward about the positioning portion 11*b*3 in that state and the support plate 16 is sandwiched by the front columnar portion 41*c*1 and the rear columnar portion 41*c*2. Simultaneously, the center console 4 is restricted from moving in the upper and lower direction when the clip C attached to the clip support portion 41*c*3 is fitted and fixed by being inserted into the clip hole 16*a* of the support plate 16. In this manner, the center console 4 can be attached to the seat cushion 3 even in a situation where a sufficient space is not secured in the left and right side portions of the seat cushion 3.

Further, the projecting piece reception portion 41*a*1, the front columnar portion 41*c*1, the rear columnar portion 41*c*2 and the clip support portion 41*c*3 of the center console 4 are provided on the lower surface side of the upper surface portion 41. In addition, the left side surface portion 42 is formed to extend downward from one end portion of the upper surface portion 41 which is distant from the seat cushion 3 than another side end portion of the upper surface portion 41. In this manner, the projecting piece reception portion 41*a*1, the front columnar portion 41*c*1, the rear columnar portion 41*c*2 and the clip support portion 41*c*3 are not visible from the outside, so that the external appearance can be improved. Further, since the left side surface portion 42 of the center console 4 is locked to the fixing wire 17 of the cushion frame 10 by the front hook 42*a*, the central hook 42*b* and the rear hook 42*c*, rattling is suppressed and the center console is firmly attached to the cushion frame 10.

Furthermore, the rear end portion side of the center console 4 is restricted from moving downward with respect to the seat cushion 3 when the lower surface of the upper plate portion 41*a*12 is brought into contact with the upper end surface portion 11*b*34 of the positioning portion 11*b*3 in a state where the projecting piece reception portion 41*a*1 is locked to the positioning portion 11*b*3 from the front side. Further, the rear end portion side of the center console 4 is restricted from moving in the left and right direction with respect to the seat cushion 3 when the rear wall portion 11*b*31 and the front wall portion 11*b*32 of the positioning portion 11*b*3 are respectively brought into contact with each of the pair of side plate portions 41*a*11 of the projecting piece reception portion 41*a*1 in a state where the projecting piece reception portion 41*a*1 is locked to the positioning portion 11*b*3 from the front side. In this manner, the front columnar portion 41*c*1, the rear columnar portion 41*c*2 and the clip support portion 41*c*3 can be smoothly locked to the support plate 16.

In addition, the center console 4 is restricted from moving in the front and rear direction with respect to the seat cushion 3 when the front columnar portion 41*c*1 and the rear columnar portion 41*c*2 are engaged to sandwich the support plate 16 from the front and rear sides. Further, the center console 4 is restricted from moving in the upper and lower direction with respect to the seat cushion 3 when the clip C attached to the clip support portion 41*c*3 is engaged with the clip hole 16*a* of the support plate 16. In this manner, the center console 4 can be attached to the seat cushion 3 without rattling. Further, since the chamfered portion 41*c*111 and the chamfered portion 41*c*211 are respectively formed at the rear lower corner portion of the front columnar portion 41*c*1 and the front lower corner portion of the rear columnar portion 41*c*2, the front columnar portion 41*c*1 and the rear columnar portion 41*c*2 can be smoothly fitted to the support plate 16.

Although specific embodiments have been described above, the disclosure is not limited to the appearances and configurations in these embodiments, and various modifications, additions and deletions can be made without changing the spirit of the disclosure. For example, the following configurations can be adopted.

1. In the above embodiment, the positioning member 11*b* is attached to the lower arm 11*a*. However, the disclosure is not limited thereto. For example, the positioning member 11*b* may be directly attached to the side frame 11.

2. In the above embodiment, the center console 4 is attached to the seat cushion 3. However, the disclosure is not limited thereto. For example, the decorative body may be a member such as a shield for hiding the side portion of the seat cushion 3.

3. In the above embodiment, the positioning member 11*b* on the side of the cushion frame 10 corresponding to the first locked portion is formed as a convex member, and the projecting piece reception portion 41*a*1 on the side of the center console 4 corresponding to the first locking portion is formed as a concave member. However, the disclosure is not limited thereto. For example, a member on the side of the center console 4 corresponding to the first locking portion may be formed as a convex member, and a member on the side of the cushion frame 10 corresponding to the first locked portion may be formed as a concave member.

4. In the above embodiment, the disclosure is applied to an automobile seat. However, the disclosure may be applied to a seat mounted on an airplane, a ship, a train, or the like.

The disclosure provides illustrative, non-limiting examples as follows:

According to a first aspect of the disclosure, there is provided a vehicle seat including: a decorative body extending in a front and rear direction of the seat and attached to a side portion of a seat cushion; and a cushion side frame serving as a side framework of one side of the seat cushion which is closer to the decorative body than another side of the seat cushion, wherein the decorative body includes a first locking portion provided to a portion of the decorative body corresponding to a rear end portion side of the seat cushion and a second locking portion provided to a portion of the decorative body corresponding to a front end portion side of the seat cushion, wherein the cushion side frame includes a first locked portion provided to a portion of the cushion side frame corresponding to the first locking portion and a second locked portion provided to a portion of the cushion side frame corresponding to the second locking portion, wherein the first locking portion is configured to restrict the decorative body from moving in a seat width direction with respect to the seat cushion and allow a front end portion side of the decorative body to be pivoted in an upper and lower direction about the first locked portion when the first locking portion is locked to the first locked portion from the front side, and wherein the second locking portion is configured to be locked to the second locked portion from an upper side when the front end portion side of the decorative body is pivoted downward about the first locked portion.

According to the first aspect, the decorative body can be attached to the seat cushion the decorative body by locking the first lock portion to the first locked portion from the front side, and pivoting the front end portion side of the decorative body downward about the first locked portion so as to lock the second locking portion to the second locked portion in a state where the decorative body is restricted from moving in the seat width direction with respect to the side portion of the seat cushion. In this manner, it is possible to provide the vehicle seat having the decorative body, in which the decorative body can be attached to the vehicle seat even in a situation where a sufficient space is not secured at the side portion in the seat width direction of the seat cushion.

According to a second aspect of the disclosure, there is provided the vehicle seat according to the first aspect, wherein the decorative body includes: an upper surface portion extending in the seat width direction; and a side surface portion extending downward to be substantially perpendicular to the upper surface portion from one side end portion of the upper surface portion which is distant from the seat cushion than another side end portion of the upper surface portion, and wherein the first locking portion is provided on a lower surface side of a rear end portion side of the upper surface portion, and the second locking portion is provided on a lower surface side of a front end portion side of the upper surface portion.

According to the second aspect, the first locking portion and the second locking portion are provided on the lower surface side of the upper surface portion of the decorative body, and the side surface portion is formed to extend downward from the one end portion of the upper surface portion which is distant from the seat cushion than the other side end portion of the upper surface portion. Therefore, the first locking portion and the second locking portion are not visible from the outside, so that the external appearance can be improved.

According to a third aspect of the disclosure, there is provided the vehicle seat according to the second aspect, wherein a third locking portion is provided on a surface of the side surface portion facing the seat cushion, and a third locked portion is provided to a portion of the cushion side frame corresponding to the third locking portion, and wherein the third locking portion is configured to be locked to the third locked portion from the upper side when the front end portion side of the decorative body is pivoted downward about the first locked portion.

According to the third aspect, since the decorative body is attached to the cushion side frame by the first locking portion, the second locking portion and the third locking portion, rattling is suppressed and the decorative body can be firmly attached to the vehicle seat.

According to a fourth aspect of the disclosure, there is provided the vehicle seat according to the third aspect, wherein the third locked portion is a wire provided to the cushion side frame and extending in the front and rear direction of the seat, and the third locking portion is a hook having a substantially U-shaped cross section opened downward.

According to the fourth aspect, the third locking portion and the third locked portion can have a simple structure.

According to a fifth aspect of the disclosure, there is provided the vehicle seat according to any one of the first to fourth aspects, wherein the first locking portion includes an upper wall portion and a pair of side wall portions extending downward from the upper wall portion and facing each other in the seat width direction, and is formed in a substantially U-shaped cross section opened downward, and wherein the first locked portion extends forward and is configured to restrict a rear end portion side of the decorative body from moving in the seat width direction and the downward direction with respect to the seat cushion when the first locked portion is inserted between the pair of side wall portions of the first locking portion.

According to the fifth aspect, the rear end portion side of the decorative body is restricted from moving downward with respect to the seat cushion when the upper end portion of the first locked portion is brought into contact with the lower surface of the upper wall portion of the first locking portion in a state where the first locking portion is locked to the first locked portion from the front side. Further, the rear end portion side of the decorative body is restricted from moving in the seat width direction with respect to the seat cushion when the left and right end portions of the first locked portion are brought into contact with the inner surfaces of the pair of side wall portions of the first locking portion in a state where the first locking portion is locked to the first locked portion from the front side. In this manner, the second locking portion can be smoothly locked to the second locked portion, and the third locking portion can be smoothly locked to the third locked portion.

According to a sixth aspect of the disclosure, there is provided the vehicle seat according to any one of the second to fifth aspects, wherein the second locked portion has a through-hole penetrating a strip-like plate material in the upper and lower direction, the strip-like plate material being provided to the cushion side frame and extending substantially horizontally in the seat width direction, and wherein the second locking portion includes a front columnar portion located on the front side, a rear columnar portion located on the rear side, and a clip support portion that supports a clip inserted into and engaged with the through-hole, the front columnar portion and the rear columnar portion being erected downward from a lower surface of the upper surface portion and sandwiching the strip-like plate material from the front and rear direction of the seat.

According to the sixth aspect, the decorative body is restricted from moving in the front and rear direction of the seat with respect to the seat cushion when the front columnar portion and the rear columnar portion of the second locking portion are engaged to sandwich the strip-like plate material which is the second locked portion from the front and rear direction of the seat. Further, the clip support portion of the second locking portion restricts the decorative body from moving in the upper and lower direction with respect to the seat cushion when the clip supported by the clip support portion is engaged with the through-hole of the strip-like plate material which is the second locked portion. In this manner, the decorative body can be attached to the seat cushion without rattling.

According to a seventh aspect of the disclosure, there is provided the vehicle seat according to the sixth aspect, wherein the front columnar portion is formed to be longer than the rear columnar portion in a downward direction, and a corner portion of a lower end portion of the front columnar portion on a side of the second locked portion and a corner portion of a lower end portion of the rear columnar portion on the side of the second locked portion are chamfered.

According to the seventh aspect, the front columnar portion located at a position distant from the first locked portion that is the pivot center is formed to be longer downward than the rear columnar portion located at a position close to the first locked portion, and corner portions of the lower end portions of the front columnar portion and the rear columnar portion on the side of the second locked portion are chamfered. In this manner, the second locking portion is smoothly positioned in the front and rear direction of the seat with respect to the second locked portion.

What is claimed is:

1. A vehicle seat comprising:
a decorative body extending in a front and rear direction of the seat and attached to a side portion of a seat cushion, the seat cushion serving as a seating part of the vehicle seat; and
a cushion side frame serving as a side framework of one side of the seat cushion which is closer to the decorative body than another side of the seat cushion,
wherein the decorative body includes a first locking portion provided to a portion of the decorative body corresponding to a rear end portion side of the seat cushion and a second locking portion provided to a portion of the decorative body corresponding to a front end portion side of the seat cushion, the second locking portion provided on a bottom surface of the decorative body,
wherein the cushion side frame includes a first locked portion provided to a portion of the cushion side frame corresponding to the first locking portion and a second locked portion provided to a portion of the cushion side frame corresponding to the second locking portion,
wherein the first locking portion is configured to restrict the decorative body from moving in a seat width direction with respect to the seat cushion and allow a front end portion side of the decorative body to be pivoted in an upper and lower direction about the first locked portion when the first locking portion is locked to the first locked portion from the front side, and
wherein the second locking portion is configured to be locked to the second locked portion when the front end portion side of the decorative body is pivoted downward toward the cushion side frame about the first locked portion.

2. The vehicle seat according to claim 1,
wherein the decorative body includes:
an upper surface portion extending in the seat width direction; and
a side surface portion extending downward to be substantially perpendicular to the upper surface portion from one side end portion of the upper surface portion which is distant from the seat cushion than another side end portion of the upper surface portion, and
wherein the first locking portion is provided on a lower surface side of a rear end portion side of the upper surface portion, and the second locking portion is provided on a lower surface side of a front end portion side of the upper surface portion.

3. The vehicle seat according to claim 2,
wherein a third locking portion is provided on a surface of the side surface portion facing the seat cushion, and a third locked portion is provided to a portion of the cushion side frame corresponding to the third locking portion, and
wherein the third locking portion is configured to be locked to the third locked portion from the upper side when the front end portion side of the decorative body is pivoted downward about the first locked portion.

4. The vehicle seat according to claim 3,
wherein the third locked portion is a wire provided to the cushion side frame and extending in the front and rear direction of the seat, and the third locking portion is a hook having a substantially U-shaped cross section opened downward.

5. The vehicle seat according to claim 2,
wherein the second locked portion has a through-hole penetrating a strip-like plate material in the upper and lower direction, the strip-like plate material being provided to the cushion side frame and extending substantially horizontally in the seat width direction, and
wherein the second locking portion includes a front columnar portion located on the front side, a rear columnar portion located on the rear side, and a clip support portion that supports a clip inserted into and engaged with the through-hole, the front columnar portion and the rear columnar portion being erected downward from a lower surface of the upper surface portion and sandwiching the strip-like plate material from the front and rear direction of the seat.

6. The vehicle seat according to claim 5,
wherein the front columnar portion is formed to be longer than the rear columnar portion in a downward direction, and a corner portion of a lower end portion of the front columnar portion on a side of the second locked portion and a corner portion of a lower end portion of the rear columnar portion on the side of the second locked portion are chamfered.

7. The vehicle seat according to claim 1,
wherein the first locking portion includes an upper wall portion and a pair of side wall portions extending downward from the upper wall portion and facing each other in the seat width direction, and is formed in a substantially U-shaped cross section opened downward, and
wherein the first locked portion extends forward and is configured to restrict a rear end portion side of the decorative body from moving in the seat width direction and the downward direction with respect to the seat cushion when the first locked portion is inserted between the pair of side wall portions of the first locking portion.

8. The vehicle seat according to claim 1,
further comprising a back rest that is separate from the seating part.

* * * * *